UNITED STATES PATENT OFFICE.

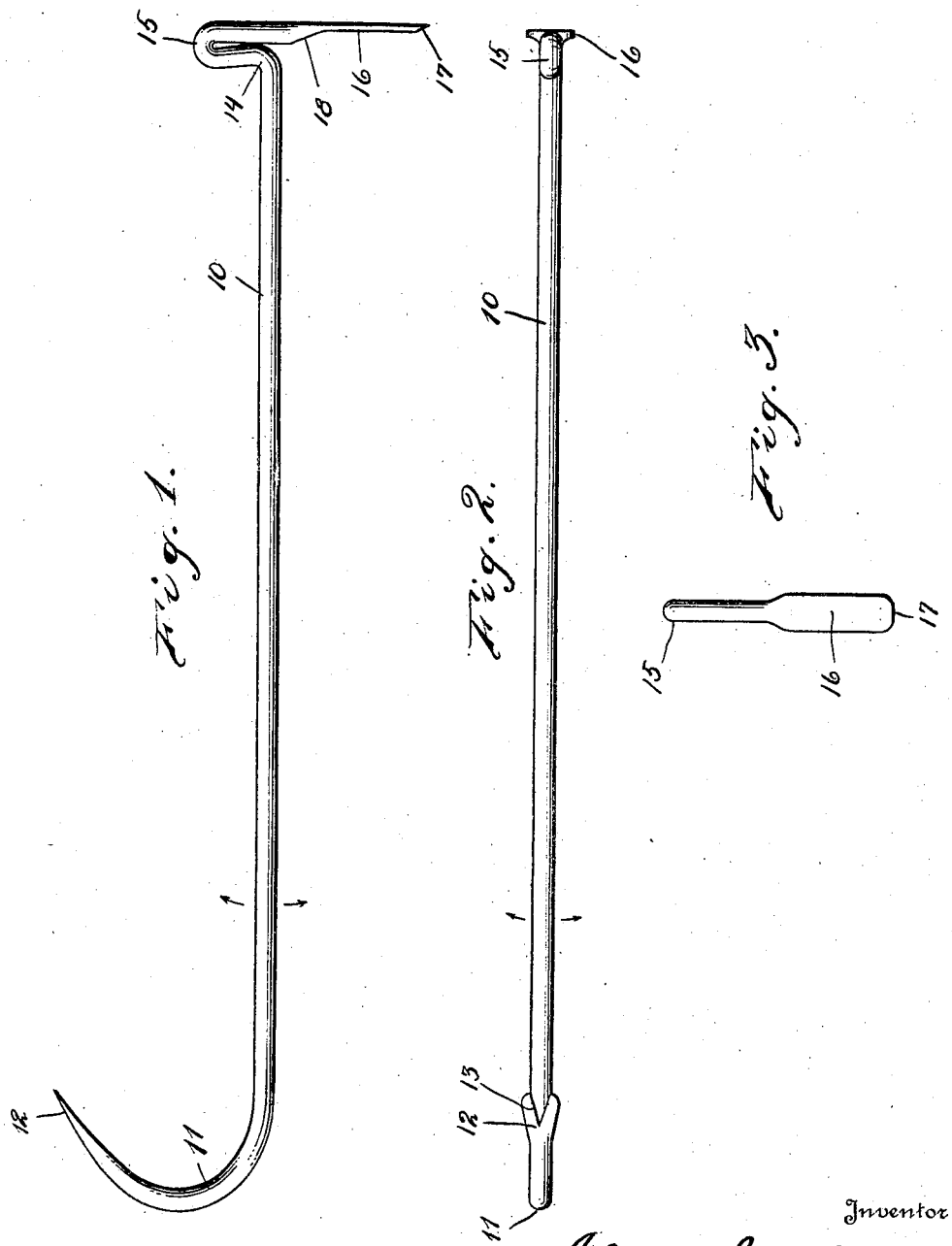

ALBERT JUELFS, OF McPHERSON, KANSAS.

WRECKING-BAR.

1,377,014. Specification of Letters Patent. Patented May 3, 1921.

Application filed September 2, 1920. Serial No. 407,719.

*To all whom it may concern:*

Be it known that I, ALBERT JUELFS, a citizen of the United States, residing at McPherson, in the county of McPherson and State of Kansas, have invented new and useful Improvements in Wrecking - Bars, of which the following is a specification.

This invention relates to tools used in tearing down buildings, bridges, and other structures, and has for its object the provision of a wrecking bar which is peculiarly constructed from a single piece of material and which is formed at one end with a claw for pulling out spikes, nails, and the like and which is formed at its other end to define a chisel adapted to be forced in between timbers or boards, this second mentioned end being furthermore provided with an impact receiving portion adapted to be struck by a hammer, sledge or the like whereby to force the chisel between pieces to be separated.

An important object is the provision of a device of this character which is formed from a single bar properly bent in the desired shape and having an end portion flattened and sharpened.

An additional object is the provision of a device of this character which will be very simple and inexpensive in construction, highly efficient in use, durable in service, and a general improvement in the art.

With the above and other objects and advantages in view, the invention consists in the details of construction to be hereinafter more fully described and claimed and illustrated in the accompanying drawings in which—

Figure 1 is a side elevation of the device,

Fig. 2 is an elevation at right angles to Fig. 1, and

Fig. 3 is an end view.

Referring more particularly to the drawings I have shown my device as comprising a bar 10 formed of steel and preferably though not necessarily round in cross section. At one end this bar is curved, laterally, as shown at 11, and terminates in a flattened and widened portion 12 formed with a V-shaped notch 13 constituting a claw for extracting nails or spikes.

Adjacent its other end the bar 10 is bent laterally, as shown at 14, and is then bent upon itself, as shown at 15, with its terminal portion extending laterally from and at substantially right angles to the body of the bar at the opposite side thereof. This second mentioned terminal portion is flattened and widened, as shown at 16, to define a chisel and the end of this chisel is preferably beveled or sharpened, as indicated at 17. The material at the bend 15 constitutes or serves as an impact receiving portion adapted to be struck by a hammer, sledge or the like whereby to force the chisel 16 into the desired location.

In the use of the device the chisel edge 17 is disposed at the crack between pieces of material to be separated or torn apart, after which the operator strikes the device at the bend 15 to force the chisel blade 16 between the pieces. At the juncture of the chisel blade with the round portion of the bar is naturally formed an inclined surface 18 which constitutes a wedge and which will tend to spread apart pieces of material if the chisel be driven between them to this point. After the chisel is forced into place it is readily apparent that the bar 10 may be moved sidewise in either direction, as indicated by the arrows in Fig. 2, or it may be moved sidewise in the other directions, as indicated by the arrows in Fig. 1, so as to loosen and consequently tear apart the pieces to be separated.

From the foregoing description and a study of the drawings it will be apparent that I have thus provided a very simple and consequently inexpensive wrecking bar which will be very highly efficient in use, as being easily insertible at the desired location and which is not likely to destroy the material separated to any appreciable extent. Owing to the fact that the device is formed from a single piece of steel it is apparent that there will be no parts to become loose and it will therefore be observed that the device will be durable.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described comprising a bar formed at one end with a laterally extending impact receiving portion adapted to be struck and formed at its terminal portion with a flattened and widened portion extending in the opposite direction to and alining with said impact receiving portion and constituting a chisel blade, the juncture of one face of the blade with the bar being inclined whereby to constitute a wedge.

2. A device of the character described comprising a bar having one end portion bent laterally at a substantial right angle and rebent upon itself to define a projection extending from one side of the bar and adapted to receive a blow, the terminal portion extending laterally at substantially right angles to the bar at the side thereof opposite said blow receiving portion and being flattened to define a chisel blade formed with a sharpened edge, the juncture of the inner face of the chisel blade with the bar being inclined whereby to constitute a wedge.

In testimony whereof I have hereto affixed my signature.

ALBERT JUELFS.